United States Patent
Gaskins (10) Patent No.: US 7,441,064 B2
(45) Date of Patent: Oct. 21, 2008

(54) FLEXIBLE WIDTH DATA PROTOCOL

(75) Inventor: Darius D. Gaskins, Austin, TX (US)

(73) Assignee: Via Technologies, Inc., Taipei (TW)

( * ) Notice: Subject to any disclaimer, the term of this patent is extended or adjusted under 35 U.S.C. 154(b) by 73 days.

(21) Appl. No.: 11/374,663

(22) Filed: Mar. 13, 2006

(65) Prior Publication Data

US 2007/0011387 A1    Jan. 11, 2007

Related U.S. Application Data

(60) Provisional application No. 60/698,149, filed on Jul. 11, 2005.

(51) Int. Cl.
*G06F 13/00* (2006.01)

(52) U.S. Cl. ....................................... 710/307

(58) Field of Classification Search .................. 710/307; 713/400
See application file for complete search history.

(56) References Cited

U.S. PATENT DOCUMENTS

| | | | |
|---|---|---|---|
| 4,796,232 A | | 1/1989 | House |
| 5,255,378 A | | 10/1993 | Crawford et al. |
| 5,537,624 A | * | 7/1996 | Whitesell .................... 710/307 |
| 5,561,780 A | | 10/1996 | Glew et al. |
| 5,640,517 A | | 6/1997 | Parks et al. |
| 5,644,788 A | | 7/1997 | Courtright et al. |
| 5,835,741 A | | 11/1998 | Elkhoury et al. |
| 5,901,298 A | | 5/1999 | Cummins et al. |
| 5,915,126 A | | 6/1999 | Maule et al. |
| 5,919,254 A | * | 7/1999 | Pawlowski et al. .......... 710/104 |
| 5,944,806 A | | 8/1999 | Melvin et al. |
| 5,960,453 A | | 9/1999 | Pawlowski |
| 6,012,116 A | | 1/2000 | Aybay et al. |
| 6,032,225 A | | 2/2000 | Shiell et al. |
| 6,311,245 B1 | | 10/2001 | Klein |
| 6,356,270 B2 | | 3/2002 | Pentkovski et al. |
| 6,405,280 B1 | | 6/2002 | Ryan |
| 6,405,285 B1 | | 6/2002 | Arimilli et al. |
| 6,434,654 B1 | * | 8/2002 | Story et al. .................. 710/307 |
| 6,505,259 B1 | | 1/2003 | Garcia et al. |

(Continued)

FOREIGN PATENT DOCUMENTS

EP          1242898        9/2002

(Continued)

*Primary Examiner*—Glenn A. Auve
(74) *Attorney, Agent, or Firm*—Gary R. Stanford; Richard K. Huffman; James W. Huffman (57) ABSTRACT

A microprocessor interface system including a system bus with a bus clock and a data signal group in which multiple devices are coupled to the system bus. Each device is configured to perform a half-width data transaction on the system bus in which a doubleword is transferred for each of four beats during each of four consecutive cycles of the bus clock. The data signal group may include multiple data strobes, such as first and second data strobes for latching first and third doublewords and third and fourth data strobes for latching second and fourth doublewords during each cycle of the bus clock. Each doubleword may be provided on first and second data portions of the data signal group. The first and second data strobes may latch data on the first data portion and the third and fourth data strobes may latch data on the second data portion.

20 Claims, 5 Drawing Sheets

MICROPROCESSOR SIGNALS FOR FLEXIBLE WIDTH DATA BUS

U.S. PATENT DOCUMENTS

| | | |
|---|---|---|
| 6,523,109 B1 | 2/2003 | Meier |
| 6,587,862 B1 | 7/2003 | Henderson |
| 6,601,121 B2 | 7/2003 | Singh et al. |
| 6,609,171 B1 | 8/2003 | Singh et al. |
| 6,671,752 B1 | 12/2003 | Rao et al. |
| 6,742,160 B2 | 5/2004 | Greiner |
| 6,804,735 B2 | 10/2004 | Singh et al. |
| 6,807,592 B2 | 10/2004 | Singh et al. |
| 6,907,487 B2 | 6/2005 | Singh et al. |
| 6,954,208 B2 | 10/2005 | Doyle et al. |
| 7,130,952 B2 | 10/2006 | Nanki et al. |
| 7,206,865 B2 | 4/2007 | Creta et al. |
| 2002/0029307 A1 | 3/2002 | Singh et al. |
| 2002/0103948 A1 | 8/2002 | Owen et al. |
| 2003/0088799 A1 | 5/2003 | Bodas |
| 2004/0199723 A1 | 10/2004 | Shelor |
| 2005/0066114 A1 | 3/2005 | Barth et al. |
| 2006/0053243 A1 | 3/2006 | David et al. |
| 2006/0190677 A1 | 8/2006 | Janzen |

FOREIGN PATENT DOCUMENTS

| | | |
|---|---|---|
| EP | 1416390 | 5/2004 |

* cited by examiner

QUAD-PUMPED DATA PHASE FOR 64-BYTE TRANSFER

FIG. 3

*EXEMPLARY BYTE ORDERING FOR 64-BYTE TRANSFER OVER HALF-WIDE DATA BUS*

| BEAT | BCLK | CACHE LINE BYTES TRANSFERRED OVER DATA[31:0] |
|---|---|---|
| A | 0 | 3:0 |
| B | 0 | 7:4 |
| C | 0 | 11:8 |
| D | 0 | 15:12 |
| E | 1 | 19:16 |
| F | 1 | 23:20 |
| G | 1 | 27:24 |
| H | 1 | 31:28 |
| I | 2 | 35:32 |
| J | 2 | 39:36 |
| K | 2 | 43:40 |
| L | 2 | 47:44 |
| M | 3 | 51:48 |
| N | 3 | 55:52 |
| O | 3 | 59:56 |
| P | 3 | 63:60 |

*FIG. 4*

MICROPROCESSOR SIGNALS FOR FLEXIBLE WIDTH DATA BUS

FIG. 5

CONFIGURATION LOGIC

FIG. 6

FLEXIBLE WIDTH DATA PROTOCOL

CROSS-REFERENCE TO RELATED APPLICATIONS

This application claims the benefit of U.S. Provisional Application Ser. No. 60/698,149, filed on Jul. 11, 2005, which is herein incorporated by reference for all intents and purposes.

This application is related to the following co-pending U.S. Patent Applications, all of which have a common assignee and common inventors.

| SERIAL NUMBER | FILING DATE | TITLE |
| --- | --- | --- |
| 11/364704 (CNTR.2268) | Feb. 28, 2006 | APPARATUS AND METHOD FOR SPARSE LINE WRITE TRANSACTIONS |
| 11/363826 (CNTR.2269) | Feb. 28, 2006 | MICROPROCESSOR APPARATUS AND METHOD FOR ENABLING VARIABLE WIDTH DATA TRANSFERS |
| 11/369896 (CNTR.2270) | Mar. 07, 2006 | APPARATUS AND METHOD FOR QUAD-PUMPED ADDRESS BUS |
| 11379166 (CNTR.2273) | Apr. 18, 2006 | APPARATUS AND METHOD FOR ORDERING TRANSACTION BEATS IN A DATA TRANSFER |

BACKGROUND OF THE INVENTION

1. Field of the Invention

The present invention relates to processor data buses, and more particularly to a flexible width data protocol which solves the problem of large package and unreasonable power requirements for a present day microprocessor where a significant amount of pins and power are devoted to the data bus interface of the microprocessor.

2. Description of the Related Art

In a present day microprocessor, such as an x86-compatible microprocessor, transactions (i.e., read and write transactions) to/from memory are accomplished over a system bus. These transactions include a request phase and a data (i.e., response) phase. During the request phase, an address for a transaction along with the transaction type are provided over an address signal group. The address signal group typically includes an address bus, a set of corresponding address strobe signals, and a request bus. During the data phase, data corresponding to the transaction is transferred over a data signal group. The data signal group typically includes a data bus, a set of corresponding data strobe signals, a response bus (indicating the type of response), and bus control signals. In one particular conventional configuration, the data signal group includes about 72 or so signals which must be provided on pins of a package for the microprocessor die. Many conventional configurations support "quad-pumped" transactions in which an entire cache line (e.g., eight quadwords for a 64-byte cache line) is transferred across the bus in just a few cycles (e.g., two clock cycles) of a bus or system clock. During the quad-pumped transactions for the conventional microprocessor, most of the signals of the data signal group are asserted multiple times during each clock cycle, consuming a considerable amount of power.

The present inventor has noted that the conventional data signal group configuration is problematic in certain application areas where package size and/or power are constrained. It is therefore desirable to provide a mechanism whereby the number of data signal group pins and commensurate power requirements are reduced, but where the data transfer functionality is retained. Furthermore, to accommodate varying application areas, it is desirable to provide a mechanism whereby a data transferring capability can be configured in either a full-width data bus mode as described above or in a new half-width data bus mode, as will be described herein.

SUMMARY OF THE INVENTION

A microprocessor according to an embodiment of the present invention includes a system clock pin receiving a bus clock signal, multiple data signal group pins, and data bus configuration logic. The data bus configuration logic performs a half-width data transaction on the data signal group pins in which a doubleword is transferred for each of four beats during each of four consecutive cycles of the bus clock signal.

The microprocessor data signal group pins may include multiple data strobe pins. The data strobe pins may include first and second data strobe pins for latching first and third doublewords and third and fourth data strobe pins for latching second and fourth doublewords during each of the four consecutive cycles of the bus clock signal. The data signal group pins may include first and second data portions in which each doubleword is divided between the first and second data portions. The data signal group pins may further include first and second data strobe signals which latch data on the first data portion and third and fourth data strobe signals which latch data on the second data portion.

The data bus configuration logic may include full-width protocol logic and half-width protocol logic, each responsive to an enable signal. The full-width protocol logic, when enabled, performs a full-width data transaction on the data signal group pins in which a quadword is transferred for each of four beats during each of two consecutive cycles of the bus clock signal. The half-width protocol logic, when enabled, performs the half-width data transaction on the data signal group pins.

A microprocessor interface system according to an embodiment of the present invention includes a system bus with a bus clock and a data signal group and multiple devices coupled to the system bus. Each device is configured to perform a half-width data transaction on the system bus in which a doubleword is transferred for each of four beats during each of four consecutive cycles of the bus clock. In one embodiment, each device is either a microprocessor or a bus agent.

The data signal group may include multiple data strobes. The data strobes may include first and second data strobes for latching first and third doublewords and third and fourth data strobes for latching second and fourth doublewords during each cycle of the bus clock. Each doubleword may be provided on first and second data portions of the data signal group. The data signal group may include first and second data strobes for latching data on the first data portion and third and fourth data strobes for latching data on the second data portion.

Each device may include full-width protocol logic and half-width protocol logic, each responsive to an enable signal. The full-width protocol logic, when enabled, performs a full-width data transaction on the system bus in which a quadword is transferred for each of four beats during each of two consecutive cycles of the bus clock. The half-width protocol logic, when enabled, performs the half-width data transaction on the system bus. The devices may be configured to negotiate operation of the system bus between a full-width data mode for performing the full-width data transaction and a half-width data mode for performing the half-width data transaction.

A method of performing a half-width data transaction on a system bus according to an embodiment of the present invention includes asserting a doubleword of data for each of four beats on the system bus during each of four consecutive cycles of a bus clock, and asserting at least one data strobe for each beat. The method may include asserting a first pair of data strobes to latch first and third doublewords during each bus clock cycle, and asserting a second pair of data strobes to latch second and fourth doublewords during each bus clock cycle. The method may include asserting a first data strobe to latch first and third words on a first data portion of the system bus and asserting a second data strobe to latch second and fourth words on the first data portion. The method may further include asserting a third data strobe to latch first and third words on a second data portion of the system bus and asserting a fourth data strobe to latch second and fourth words on the second data portion. The method may include asserting a data word on each of first and second data portions of the system bus.

The method may include negotiating, by each of multiple devices on the system bus, between operating the system bus in a half-width data bus mode and a full-width data bus mode. The method may include selectively enabling, by each device coupled to the system bus, half-width protocol logic for performing half-width data transactions on the system bus and full-width protocol logic for performing full-width data transactions on the system bus.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present inventor has noted that the conventional data signal group configuration is problematic in certain application areas where package size and/or power are constrained. He has therefore developed a flexible width data protocol which solves the problem of large package and unreasonable power requirements for a present day microprocessor where a significant amount of pins and power are devoted to the microprocessor's data bus interface, as will be further described below with respect to FIGS. 1-6.

Figure 1:
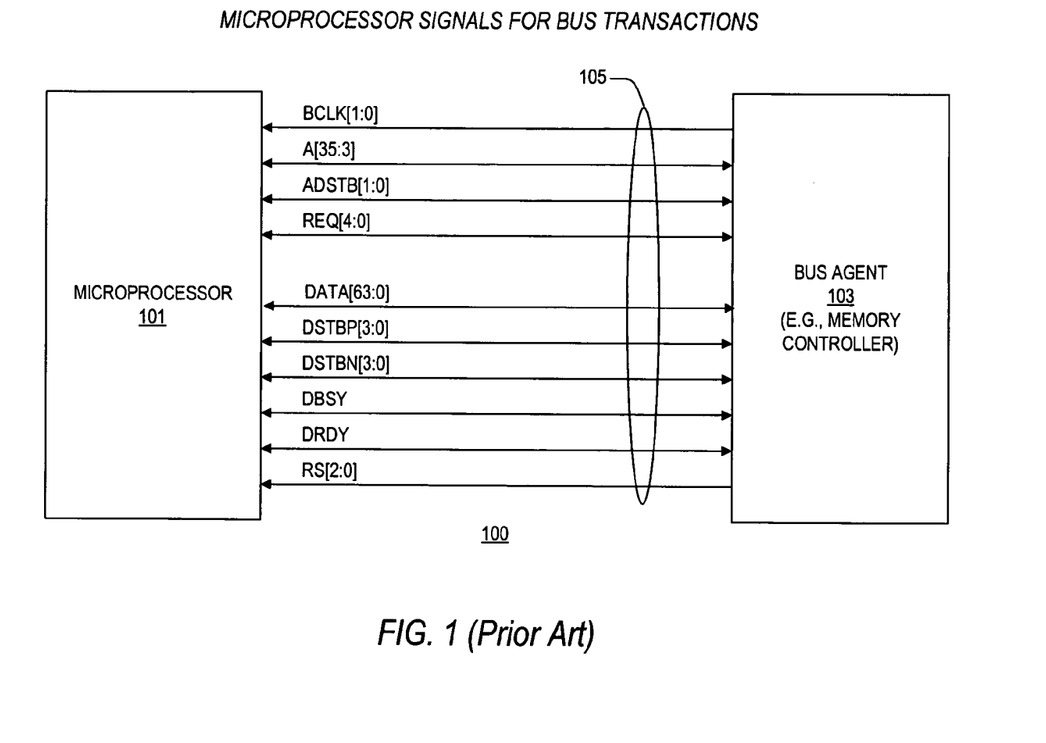
FIG. 1 is a simplified block diagram of a conventional microprocessor interface system.

FIG. 1 is a simplified block diagram of a conventional microprocessor interface system 100. The microprocessor interface system 100 includes a microprocessor 101 and a bus agent 103 interfaced with a system bus 105. The bus agent 103 represents any number of different types of bus agents as known to those skilled in the art, such as a memory controller, a host/PCI (Peripheral Component Interconnect) bridge, chipset, etc. The system bus 105 includes the signals for performing data transactions, including a bidirectional address bus A, a bidirectional data bus DATA, and multiple control signals. In the illustrated embodiment, the A bus has 33 signals shown as A[35:3] and the DATA bus has 64 signals shown as DATA[63:0], although it is understood that the address and data buses may have any suitable number of signals depending upon the particular configuration and architecture. One skilled in the art will appreciate that the least significant address signals (A[2:0]) are not required to allow for transfer of data with quadword granularity, which is the present state of the art.

The control signals include a differential clock bus BCLK [1:0], a bidirectional address strobe bus ADSTB[1:0] (indicating validity of the addresses on the A bus), a bidirectional request bus REQ[4:0] specifying the type of transaction requested (e.g., memory code read, memory data read, memory line write, memory quadword write with byte enables), a pair of data strobe buses DSTBP[3:0] and DSTBN [3:0], a bidirectional data bus busy signal DBSY (asserted by the entity that is providing data on the DATA bus), a data ready signal DRDY (asserted by either the device providing data during all clock cycles that data is transferred over the DATA bus), and a response bus RS[2:0] which provides the type of transaction response (e.g., no data, normal data, implicit writeback) that is being completed over the DATA bus. In the illustrated embodiment, the RS bus has 3 signals shown as RS[2:0] and is asserted by the bus agent 103.

The signals shown for the conventional microprocessor interface system 100 are provided in virtually all present day microprocessors with minor variation. Some processors multiplex addresses and data over the same signal group and thus provide control signals to indicate whether data or addresses are present. Other microprocessors utilize different address or data bus widths or control signals alternatively named. Still further, addresses and/or data may be multiplexed over a smaller bus size than those illustrated by the conventional microprocessor interface system 100. What is important to note is that substantially all processors provide signals for communication with bus agents to indicate what type of transaction is requested, the parameters of that transaction, and to transmit/receive the data.

In a present day microprocessor, including the microprocessor 101, data can be transferred on a cache line basis (e.g., eight quadwords for a 64-byte cache line) according to a "quad-pumped" configuration. When transferring an entire cache line, two cycles of the bus clock signals BCLK[1:0] are used to transfer the eight associated quadwords in a cache line. Accordingly, four quadwords are transferred during each cycle of the bus clock BCLK[1:0], thus accounting for the descriptor "quad-pumped." During this type of data transfer, the signals of the data strobe buses DSTBP[3:0], DSTBN[3:0] are provided to indicate the validity of various quadword beats on the data bus so that 4 beats are transferred during a single bus clock (each "beat" including the 64 bits of the DATA bus).

Figure 2:
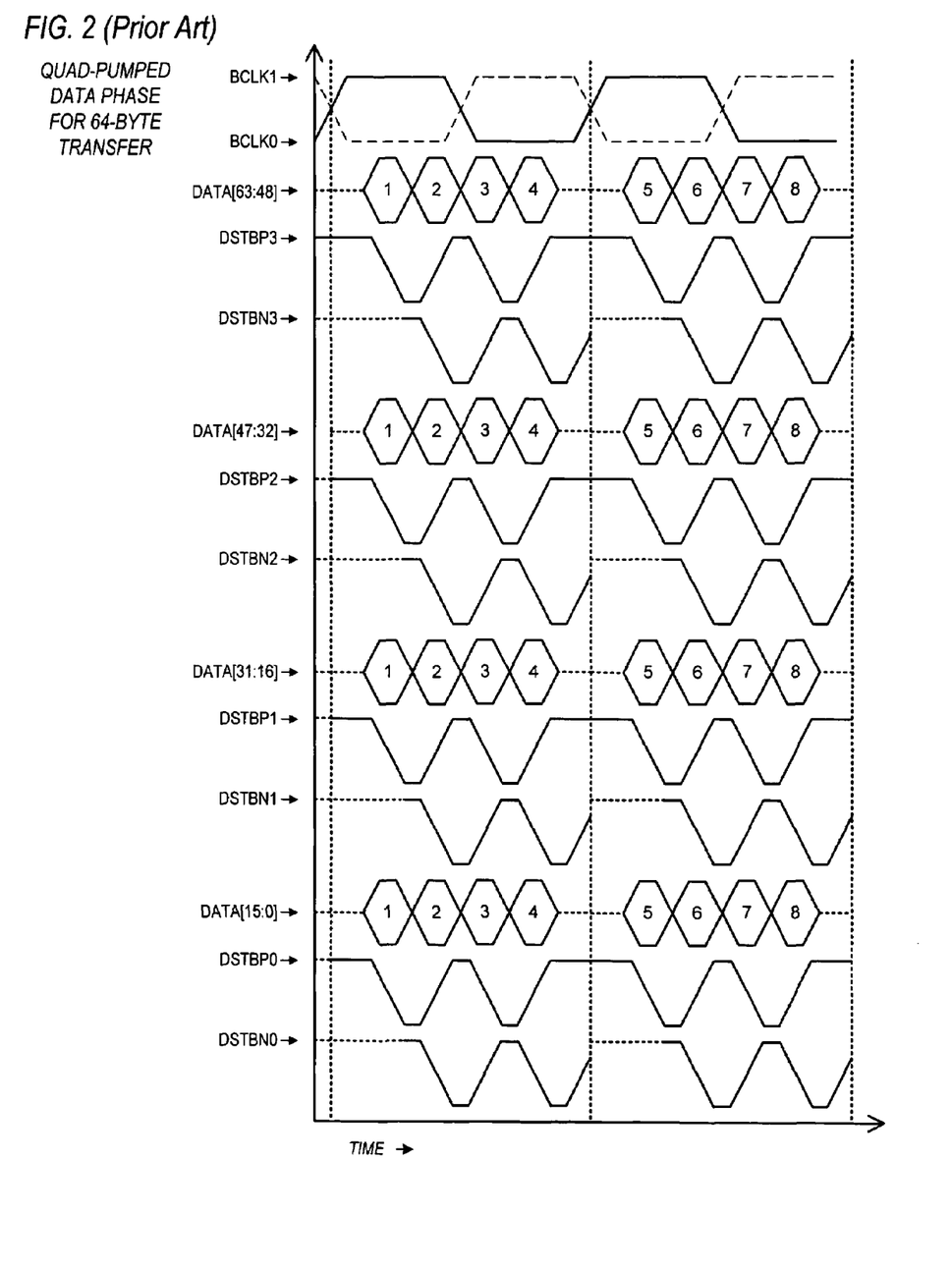
FIG. 2 is a timing diagram showing the interaction of the signals within the data signal group described with reference to the conventional microprocessor interface system of FIG. 1 for performing the data phase of a bus transaction.

FIG. 2 is a timing diagram showing the interaction of the signals within the data signal group described with reference to the conventional microprocessor interface system 100 for performing the data phase of a bus transaction. Operation of such transactions and corresponding signals as named herein in an x86-compatible microprocessor are described in numerous references, one of which is the book "The Unabridged Pentium® 4 IA32 Processor Genealogy, 1st Edition," by Tom Shanley. For clarity, assertion of the control signals is shown as a logic low level, although one skilled in the art will appreciate that assertion can as well be indicated by a logic high level. Cycles of the differential bus clock BCLK[1:0] are shown across the top of the timing diagram, in which BCLK [1] is shown using a dashed line and which toggles with opposite polarity as the BCLK[0] signal.

As noted above, the current state of the art provides for a 64-bit data bus DATA[63:0] that supports transfer during the data phase of a 64-byte cache line over two cycles of the bus clock BCLK[1:0]. The transfer of eight bytes over the 64-bit data bus is known as a beat and 4 beats 1-4, 5-8 are transferred during each cycle of the bus clock BCLK[1:0]. In an x86-compatible configuration, the data bus signal group is divided into four subgroups. Subgroup 0 includes DATA[15:0], DSTBP0, and DSTBN0; subgroup 1 includes DATA[31:16], DSTBP1, and DSTBN1; subgroup 2 includes DATA[47:32], DSTBP2, and DSTBN2; and subgroup 3 includes DATA[63:48], DSTBP3, and DSTBN3. The falling edges of DSTBP0 are used to indicate validity of words 1, 3, 5, and 7 on DATA [15:0], and the falling edges of DSTBN0 are used to indicate validity of words 2, 4, 6, and 8 on DATA[15:0]. The falling edges of DSTBP1 are used to indicate validity of words 1, 3, 5, and 7 on DATA[31:16], and the falling edges of DSTBN1 are used to indicate validity of words 2, 4, 6, and 8 on DATA [31:16]. The falling edges of DSTBP2 are used to indicate validity of words 1, 3, 5, and 7 on DATA[47:32], and the falling edges of DSTBN2 are used to indicate validity of words 2, 4, 6, and 8 on DATA[47:32]. The falling edges of DSTBP3 are used to indicate validity of words 1, 3, 5, and 7 on DATA[63:48], and the falling edges of DSTBN3 are used to indicate validity of words 2, 4, 6, and 8 on DATA[63:48].

The data signal group configuration used by the conventional microprocessor interface system 100 described above is problematic in certain application areas where package size and/or power is constrained. More particularly, the data signal group including signals DATA[63:0], DSTBP[3:0], and DSTBN[3:0] of the conventional microprocessor interface system 100 includes 72 signals which must be provided on pins of a package for the microprocessor die. Furthermore, every time one of these signals is driven to the system 105 bus, power is consumed. It is therefore desirable to provide a mechanism whereby the number of data signal group pins and commensurate power requirements are reduced, but where the data transfer functionality is retained. Furthermore, to accommodate varying application areas, it is desirable to provide a mechanism whereby a data transferring capability can be configured in either a full-width data bus mode as described above or in a new half-width data bus mode, as will be described below.

The present invention provides for a new type of data signal group, which includes a half-width quad-pumped data bus, and which requires roughly half (e.g., 36) of the data signal group signals described above with reference to a full-width quad-pumped data bus, and which requires roughly half of the power of a the full-width data bus. In one embodiment, the microprocessor and one or more bus agents may be implemented with a reduced number of data signal group pins to reduce package size and to reduce power consumption. In another embodiment, the microprocessor and one or more bus agents may each be implemented with a full-width data bus according to the conventional configuration, in which the microprocessor operates in either in the full-width data bus mode using the full-width data bus or the half-width data bus mode using the half-width data bus including only a subset of the data signal group pins to reduce power. For embodiments in which both half-width and full-width data bus modes are supported, mode switching may be performed during operation or negotiated by the devices coupled to the system bus during initialization (e.g., power-on or reset). Mode switching during operation may employ an additional signal on the system bus to switch between modes. Alternatively, an existing signal on the system bus may be employed for mode switching purposes.

Figure 3:
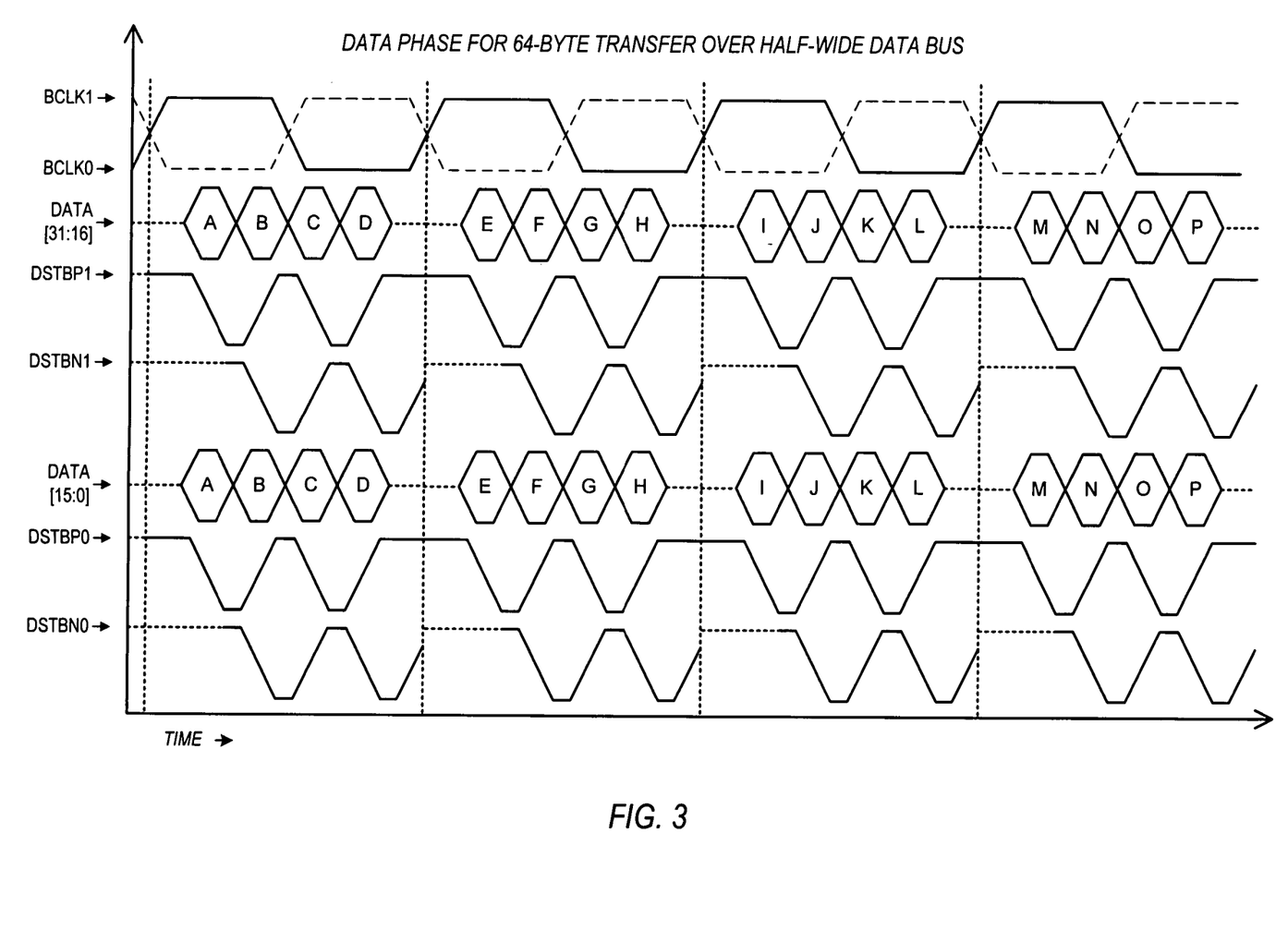
FIG. 3 is a timing diagram illustrating a data phase of a half-width quad-pumped transaction using a half-width data bus implemented according to an embodiment of the present invention.

FIG. 3 is a timing diagram illustrating a data phase of a half-width quad-pumped transaction using a half-width data bus implemented according to an embodiment of the present invention. A half-width quad-pumped data bus according to an embodiment of the present invention employs a reduced-size data signal group including data signals DATA[31:0] and four data strobe signals DSTBP[1:0] and DSTBN[1:0]. As shown by the timing diagram of FIG. 3, the data phase of the transaction still includes four beats that are driven out to the DATA bus during a single cycle of BCLK[1:0], but each of the beats consists of a transfer of a doubleword rather than a quadword. Thus, to transfer a 64-byte cache line, 16 beats A, B, C, D, E, F, G, H, I, J, K, L, M, N, O, and P (A-P) are used and the entire transfer takes 4 clock cycles rather than two clock cycles.

In an x86-compatible embodiment, the data bus signal group according to an embodiment of the present invention is divided into two subgroups. Subgroup 0 includes signals DATA[15:0], DSTBP0, and DSTBN0 and subgroup 1 includes signals DATA[31:16], DSTBP1, and DSTBN1. The falling edges of the DSTBP0 signal are used to indicate validity of words on the DATA [15:0] signals for beats A, C, E, G, I, K, M, and O. The falling edges of the DSTBN0 signal are used to indicate validity of words on the DATA[15:0] signals for beats B, D, F, H, J, L, N, and P. The falling edges of the DSTBP1 signal are used to indicate validity of words on the DATA[31:16]signals for beats A, C, E, G, I, K, M, and O. The falling edges of the DSTBN1 signal are used to indicate validity of words on the DATA[31:16] signals for beats B, D, F, H, J, L, N, and P.

Figure 4:
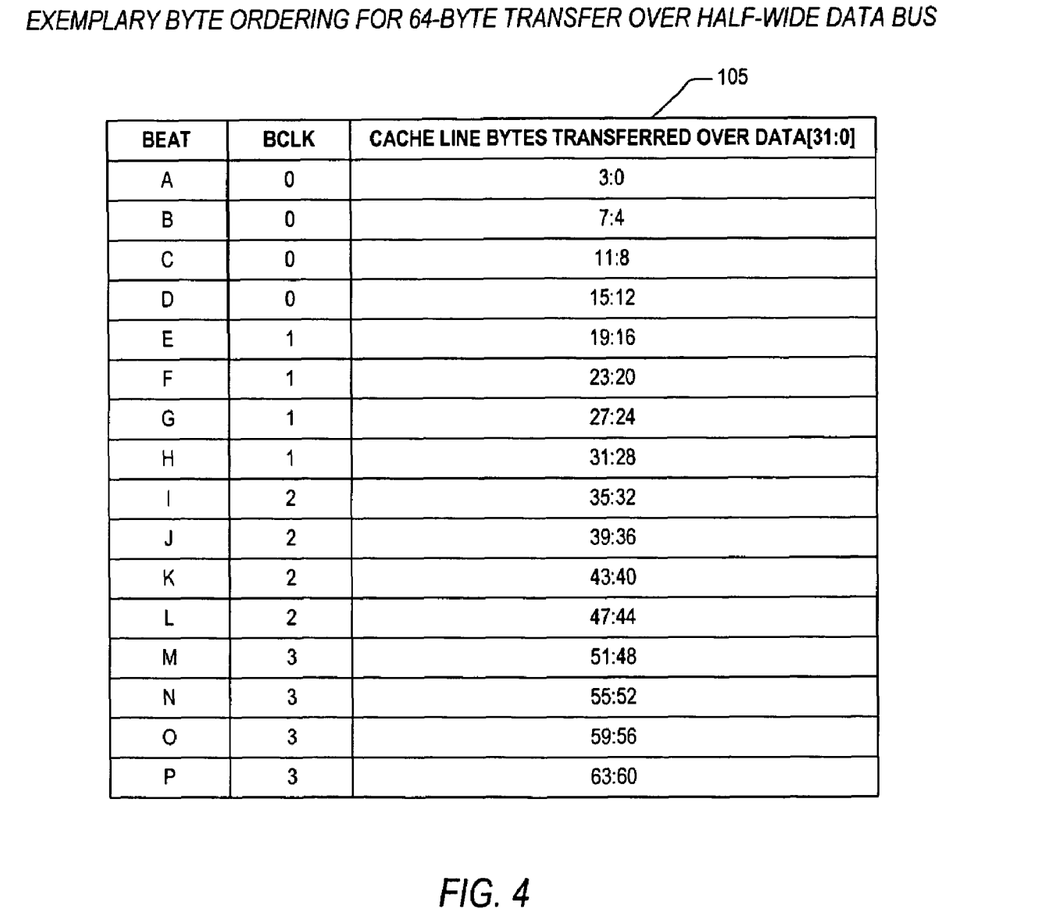
FIG. 4 is a diagram of a table illustrating how the data bus signals of a half-width quad-pumped data bus according to an embodiment of the present invention are mapped during a data phase to data bytes within a 64-byte cache line.

FIG. 4 is a diagram of a table 400 illustrating how the data bus signals DATA[31:0] of a half-width quad-pumped data bus according to an embodiment of the present invention are mapped during a data phase to data bytes within a 64-byte cache line. In table 400, the 16 beats A-P are listed versus BCLK cycles and corresponding cache line bytes transferred on the data signals DATA[31:0]. For example, during the first cycle of BCLK, or cycle 0, cache line bytes 3:0, 7:4, 11:8, and 15:12 are transferred during beats A, B, C, and D, respectively. One skilled in the art will appreciate that other mapping configurations are contemplated as well by the present invention and that the example of table 400 is provided to teach how data is transferred over the illustrated half-width data bus.

Figure 5:
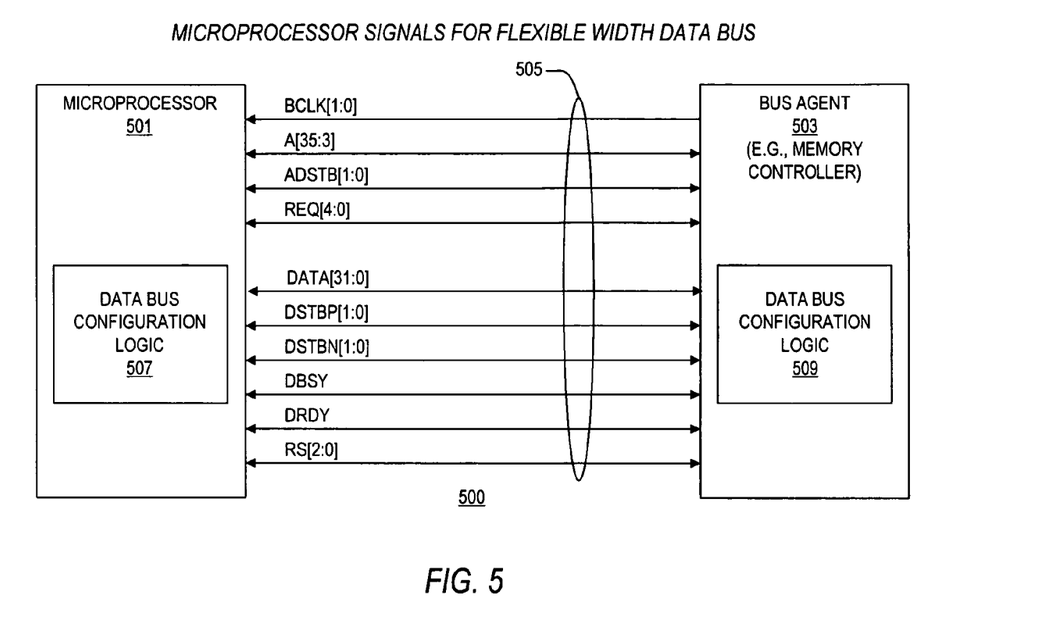
FIG. 5 is a simplified block diagram of a microprocessor interface system including a system bus with data signal group signals for a half-width quad-pumped data bus according to an embodiment of the present invention.

FIG. 5 is a simplified block diagram of a microprocessor interface system 500 including a system bus 505 with data signal group signals for a half-width quad-pumped data bus according to an embodiment of the present invention. The microprocessor interface system 500 includes a microprocessor 501 and a bus agent 503 interfaced with a system bus 505, in which the bus agent 503 represents any number of different types of bus agents as previously described for the bus agent 103. The A, ADSTB, REQ, DATA, DSTBP, DSTBN and RS buses along with the DBSY, DRDY and BCLK[1:0] signals are included. The A, ADSTB, REQ and RS buses along with the DBSY and DRDY signals operate in substantially the same manner as described above with reference to the conventional microprocessor interface system 100. In addition, the microprocessor 501 includes data bus configuration logic 507 which interfaces the DATA bus and the data strobe signals DSTBP[1:0] and DSTBN[1:0] to enable half-width quad-pumped data transactions as described with reference to FIGS. 3 and 4. And the bus agent 503 includes data bus configuration logic 509 which also interfaces the DATA bus and the data strobe signals DSTBP[1:0] and DSTBN[1:0] to enable half-width quad-pumped data transactions. In particular, the data phase for a 64-byte transfer over the half-width data bus includes beats A-P over four cycles of BCLK[1:0] as previously described. Data strobe signals DSTBP[1:0] and DSTBN[1:0] are employed to latch associated data during the four cycles of BCLK[1:0] as shown in FIG. 3.

In an alternative embodiment, the microprocessor 501 and/or the bus agent 503 include a full set of data signal group signals, e.g., the DATA[63:0] and the data strobe signals DSTBP[3:0] and DSTBN[3:0], and the data bus configuration logic 507 and 509 enable a half-width quad-pumped mode in which roughly half of the data signal group signals are employed to perform half-width quad-pumped data transactions as described with reference to FIGS. 3 and 4.

Figure 6:
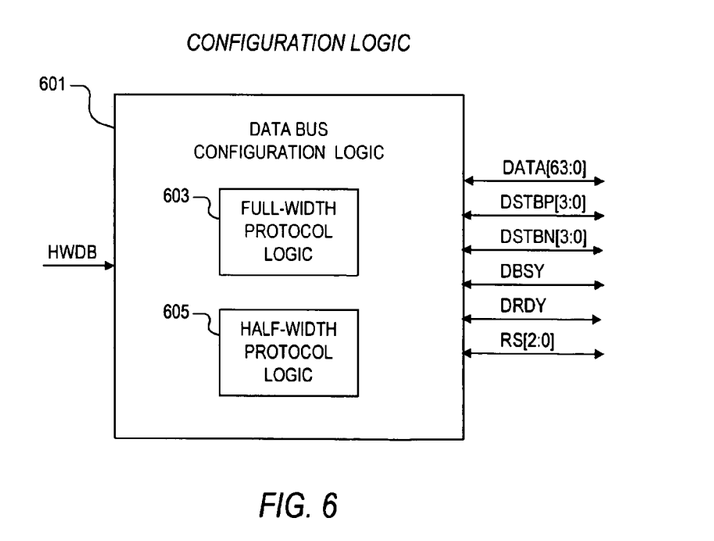
FIG. 6 is a block diagram of data bus configuration logic which may be used to implement the data bus configuration logic of FIG. 5 according to an exemplary embodiment of the present invention.

FIG. 6 is a block diagram of data bus configuration logic 601 which may be used to implement the data bus configuration logic 507 and/or the data bus configuration logic 509 according to an exemplary embodiment of the present invention. The data bus configuration logic 601 includes at least one input to which a half-width data bus configuration enable signal HWDB is provided. The data bus configuration logic 601 operates with all of the inputs/outputs of a full-width quad-pumped data signal group. Responsive to the state of HWDB, a corresponding data bus protocol is enabled via full-width protocol logic 603 (which employs all of the data bus signals shown in accordance with that shown in FIGS. 1 and 2) or half-width protocol logic 605 (which employs a subset of the data bus signals as described with reference to FIGS. 3-5). In operation, if HWDB is asserted, then a transaction data phase operates over the half-width quad-pumped data signal group as described with reference to FIGS. 3-5. If HWDB is not asserted, then a transaction data phase operates over the full-width quad-pumped data signal group as described with reference to the microprocessor interface system 100 described in FIGS. 1-2.

One skilled in the art will appreciate that signals may be shared with other signals and may be mapped differently than described herein. In one embodiment, the data bus configuration logic 601 (and/or 507/509) comprises logic, circuits, and/or microcode. In another embodiment, the data bus configuration logic 601 (and/or 507/509) receives HWDB responsive to a fuse that is blown during fabrication to establish a specific data bus configuration. Other embodiments contemplate read-only memory, write-once memory, and the like. A further embodiment provides for communication with one or more bus agents 503 when a RESET signal (not shown) or other signal on the microprocessor 501 is held asserted or otherwise is placed in a non-architectural state. The communication between the bus agent(s) 503 and the microprocessor 501 is accomplished over signals employed for half-width quad-pumped operation. The communication establishes the capability of the bus agent(s) 503 to execute in half-width quad-pumped mode. Responsive to the communication, the data bus configuration logic 601 (and/or 507/509) enables either full-width or half-width functionality.

A half-width data bus configuration system according to an embodiment of the present invention is particularly advantageous for embedded applications. One advantage is that a half-width data bus configuration system according to an embodiment of the present invention allows for approximately a 50 percent reduction in the number of pins required to provide for a present day data signal group. In addition, a half-width data bus configuration system according to an embodiment of the present invention provides for a configurable reduction in power requirements by reducing the number of data bus signals. Furthermore, a half-width data bus configuration system according to an embodiment of the present invention allows a system designer to cut memory requirements in half for applications where memory requirements are less than that provided for by existing memory components.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A microprocessor, comprising:
a system clock pin receiving a bus clock signal;
a plurality of data signal group pins; and
data bus configuration logic which performs a half-width data transaction on said plurality of data signal group pins in which a doubleword is transferred for each of four beats during each of four consecutive cycles of said bus clock signal.

2. The microprocessor of claim 1, wherein said plurality of data signal group pins comprises a plurality of data strobe pins.

3. The microprocessor of claim 2, wherein said plurality of data strobe pins comprise first and second data strobe pins for latching first and third doublewords and third and fourth data strobe pins for latching second and fourth doublewords during each of said four consecutive cycles of said bus clock signal.

4. The microprocessor of claim 1, wherein said plurality of data signal group pins comprises first and second data portions and wherein each said doubleword is divided between said first and second data portions.

5. The microprocessor of claim 4, wherein said plurality of data signal group pins comprises first and second data strobe signals which latch data on said first data portion and third and fourth data strobe signals which latch data on said second data portion.

6. The microprocessor of claim 1, wherein said data bus configuration logic comprises:

full-width protocol logic, responsive to an enable signal, which performs a full-width data transaction on said plurality of data signal group pins in which a quadword is transferred for each of four beats during each of two consecutive cycles of said bus clock signal when enabled; and half-width protocol logic, responsive to said enable signal, which performs said half-width data transaction on said plurality of data signal group pins when enabled.

7. A microprocessor interface system, comprising:
a system bus comprising a bus clock and a data signal group; and
a plurality of devices coupled to said system bus, each configured to perform a half-width data transaction on said system bus in which a doubleword is transferred for each of four beats during each of four consecutive cycles of said bus clock.

8. The microprocessor interface system of claim 7, wherein each of said plurality of devices comprises a selected one of a microprocessor and a bus agent.

9. The microprocessor interface system of claim 7, wherein said data signal group comprises a plurality of data strobes.

10. The microprocessor interface system of claim 9, wherein said plurality of data strobes comprises first and second data strobes for latching first and third doublewords and third and fourth data strobes for latching second and fourth doublewords during each of said four consecutive cycles of said bus clock.

11. The microprocessor interface system of claim 7, wherein each doubleword is provided on first and second data portions of said data signal group.

12. The microprocessor interface system of claim 11, wherein said data signal group comprises first and second data strobes for latching data on said first data portion and third and fourth data strobes for latching data on said second data portion.

13. The microprocessor interface system of claim 7, wherein each of said plurality of devices comprises:
full-width protocol logic, responsive to an enable signal, which performs a full-width data transaction on said system bus in which a quadword is transferred for each of four beats during each of two consecutive cycles of said bus clock when enabled; and
half-width protocol logic, responsive to said enable signal, which performs said half-width data transaction on said system bus when enabled.

14. The microprocessor interface system of claim 13, wherein said plurality of devices negotiate operation of said system bus between a full-width data mode for performing said full-width data transaction and a half-width data mode for performing said half-width data transaction.

15. A method of performing a half-width data transaction on a system bus, comprising:
asserting a doubleword of data for each of four beats on the system bus during each of four consecutive cycles of a bus clock; and
asserting at least one data strobe for each beat.

16. The method of claim 15, further comprising:
asserting a first pair of data strobes to latch first and third doublewords during each bus clock cycle; and
asserting a second pair of data strobes to latch second and fourth doublewords during each bus clock cycle.

17. The method of claim 16, wherein:
said asserting a first pair of data strobes to latch first and third doublewords during each bus clock cycle comprises asserting a first data strobe to latch first and third words on a first data portion of the system bus and asserting a second data strobe to latch second and fourth words on said first data portion; and
wherein said asserting a second pair of data strobes to latch second and fourth doublewords during each bus clock cycle comprises asserting a third data strobe to latch first and third words on a second data portion of the system bus and asserting a fourth data strobe to latch second and fourth words on the second data portion.

18. The method of claim 15, wherein said asserting a doubleword of data for each of four beats on the system bus during each of four consecutive cycles of a bus clock comprises asserting a data word on each of first and second data portions of the system bus.

19. The method of claim 15, further comprising negotiating, by a plurality of devices coupled to the system bus, between operating the system bus in a half-width data bus mode and a full-width data bus mode.

20. The method of claim 15, further comprising selectively enabling, by at least one device coupled to the system bus, half-width protocol logic for performing half-width data transactions on the system bus and full-width protocol logic for performing full-width data transactions on the system bus.

* * * * *